(12) United States Patent
Suryanarayana et al.

(10) Patent No.: US 10,715,419 B1
(45) Date of Patent: Jul. 14, 2020

(54) SOFTWARE DEFINED NETWORKING BETWEEN VIRTUALIZED ENTITIES OF A DATA CENTER AND EXTERNAL ENTITIES

(71) Applicant: Juniper Networks, Inc., Sunnyvale, CA (US)

(72) Inventors: Anantharamu Suryanarayana, San Jose, CA (US); Pramodh S. D'Souza, San Jose, CA (US); Aniket G. Daptari, San Jose, CA (US); Vivekananda Shenoy, Sunnyvale, CA (US); Nischal Kumar N. Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 130 days.

(21) Appl. No.: 16/126,712

(22) Filed: Sep. 10, 2018

(51) Int. Cl.
*H04L 12/46* (2006.01)
*H04L 12/715* (2013.01)
*H04L 12/66* (2006.01)
*H04L 12/723* (2013.01)

(52) U.S. Cl.
CPC .......... *H04L 45/04* (2013.01); *H04L 12/4633* (2013.01); *H04L 12/4641* (2013.01); *H04L 12/66* (2013.01); *H04L 45/507* (2013.01); *H04L 45/64* (2013.01)

(58) Field of Classification Search
CPC ....... H04L 45/04; H04L 45/507; H04L 12/66; H04L 12/4641; H04L 12/4633
See application file for complete search history.

(56) References Cited

U.S. PATENT DOCUMENTS

| 9,178,809 | B1* | 11/2015 | Shen | ................ H04L 12/4633 |
| 2017/0180154 | A1* | 6/2017 | Duong | ................ H04L 12/4633 |
| 2017/0257228 | A1* | 9/2017 | Chen | .................. H04L 47/825 |

OTHER PUBLICATIONS

Rekhter et al. "Carrying Label Information in BGP-4" Network Working Group, RFC 3107, May 2001, 8 pp.
Rosen et al. "BGP/MPLS IP Virtual Private Networks (VPNs)" Network Working Group, RFC 4363, Feb. 2006, 47 pp.
Worster et al. "Encapsulating MPLS in IP or Generic Routing Encapsulation (GRE)" Network Working Group, RFC 4023, 14 pp.
Xu et al. "Encapsulating MPLS in UDP" Internet Engineering Task Force (IETF), RFC 7510, Apr. 2015, 19 pp.

* cited by examiner

*Primary Examiner* — Curtis A Alia
(74) *Attorney, Agent, or Firm* — Shumaker & Sieffert, P.A.

(57) ABSTRACT

Techniques are disclosed for providing an inter-autonomous system (inter-AS) service between virtualized entities of one autonomous system with external entities of a different autonomous system. For example, a controller (e.g., software defined networking (SDN) controller) may provide multi-hop exterior Border Gateway Protocol (eBGP) redistribution of virtual private networking (VPN) labels between endpoints of different autonomous systems, otherwise referred to as "inter-AS option C." As described in this disclosure, the SDN controller may facilitate the exchange of appropriate routing labels between endpoints of different autonomous systems to enable forwarding of traffic between the different autonomous systems.

15 Claims, 7 Drawing Sheets

SOFTWARE DEFINED NETWORKING BETWEEN VIRTUALIZED ENTITIES OF A DATA CENTER AND EXTERNAL ENTITIES

TECHNICAL FIELD

This disclosure generally relates to computer networks, and more specifically, to distributed applications.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form.

A virtual private network (VPN) may be used to extend two or more remote layer 2 (L2) customer networks through an intermediate layer 3 (L3) network (usually referred to as a provider network), such as the Internet, in a transparent manner, i.e., as if the network does not exist. In particular, the VPN transports layer two (L2) communications, such as "frames," between customer networks via the network. In a typical configuration, routers coupled to the customer networks define label switched paths (LSPs) through the intermediate network in accordance with one or more multiprotocol label switching (MPLS) protocols.

In some cases, a VPN may be supported across multiple autonomous systems (ASes) within two or more service provider (SP) networks. Each AS may comprise an individual network including at least one border device that communicates with routers in other autonomous systems, and each AS may be owned or managed by a different service provider. The border device typically uses a Border Gateway Protocol ("BGP") (i.e., an L3 routing protocol), such as an external BGP ("eBGP") to advertise locally learned addresses to other border devices in other autonomous systems and an internal BGP ("iBGP") to advertise learned addresses within the autonomous system.

Customer devices may connect to services provided by data centers. Data centers may host infrastructure equipment, that provide customer devices with network services. For example, data centers may host web services for enterprises and end users. Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices. In some instances, customer devices may connect to data centers over multiple autonomous systems of two or more service providers.

SUMMARY

In general, the disclosure describes techniques for providing an inter-autonomous system (inter-AS) service between virtualized entities of one autonomous system with external entities of a different autonomous system. For example, a controller (e.g., software defined networking (SDN) controller) may provide multi-hop exterior Border Gateway Protocol (eBGP) redistribution of virtual private networking (VPN) labels between endpoints of different autonomous systems, otherwise referred to as "inter-AS option C." As described in this disclosure, the SDN controller may facilitate the exchange of appropriate routing labels between endpoints of different autonomous systems to enable forwarding of traffic between the different autonomous systems.

As one example, the SDN controller may establish respective communication sessions with each of an autonomous system border router (ASBR) and a virtual router of a data center within a first autonomous system to share with the virtual router an MPLS label, e.g., a BGP labeled unicast (BGP-LU) label, that was learned by the ASBR from a BGP peer gateway device in a second autonomous system. In one instance, the SDN controller may establish a first communication session with the ASBR (e.g., an internal BGP session) to learn the BGP-LU label. The SDN controller may also establish a second communication session with the virtual router (e.g., an Extensible Messaging and Presence Protocol (XMPP) session) to send the learned BGP-LU label to the virtual router such that the virtual router may use the BGP-LU label to forward traffic to the gateway device of the second autonomous system via the ASBR.

The SDN controller may also establish communication sessions with each of the gateway device and the virtual router to share a virtual private networking (VPN) label that identifies an interface of the virtual router such that the gateway device of the second autonomous system may use the VPN label to forward traffic to the virtual router of the first autonomous system. In one instance, the SDN controller may learn a VPN label from the virtual router via the XMPP session. The SDN controller may also establish a third communication session with the gateway device (e.g., an external BGP session) to send the VPN label that the SDN controller learned from the virtual router to the gateway device. The gateway device of the second autonomous system may use the VPN label to forward traffic to a corresponding destination of the virtual router of the first autonomous system.

To forward traffic to a final destination outside the gateway device of a different autonomous system, the virtual router may encapsulate an outgoing data packet with a label stack having two labels—an inner VPN label and an outer BGP-LU label (received from the SDN controller)—such that the ASBR, in response to receiving the encapsulated packet via a tunnel within the data center, may forward the encapsulated packet to a BGP peer gateway device, which in turn forwards the packet based on the VPN label to the final destination. By encapsulating the data packet with the two labels, MPLS is not natively introduced into the data center.

To forward traffic from the gateway device to the virtual router, the gateway device may encapsulate a packet destined for the virtual router with an inner VPN label (received from the SDN controller) and an outer BGP-LU label. When the ASBR receives the packet from the BGP peer gateway device, the ASBR removes (i.e., "pops") the BGP-LU label and sends the packet with the VPN label to the virtual router. That is, the ASBR may send the traffic destined for the virtual router through the switch fabric without including MPLS in the data center.

In this way, the techniques may provide for an SDN controller to facilitate an exchange of routing labels such that an inter-autonomous system (inter-AS) service, e.g., inter-AS option C, is implemented with an SDN controller.

In one example, a method includes configuring, by a software defined networking (SDN) controller, a first communication session with an autonomous system border router (ASBR) of a data center within a first autonomous system, wherein the data center includes a compute node having configured a virtual router. The method also includes configuring, by the SDN controller, a second communication session with the virtual router of the first autonomous system. The method further includes learning, by the SDN controller and from the ASBR via the first communication session, a Border Gateway Protocol Labeled Unicast (BGP-LU) label used to forward traffic from the ASBR of the first autonomous system to a gateway device of a second autonomous system. The method also includes sending, by the SDN controller via the second communication session, the BGP-LU label to the virtual router of the first autonomous system such that the virtual router learns the BGP-LU label used to forward traffic to the gateway device of the second autonomous system.

In another example, a software defined networking controller includes one or more processors, wherein the one or more processors are configured to: configure a first communication session with an autonomous system border router (ASBR) of a data center within a first autonomous system, wherein the data center includes a compute node having configured a virtual router; configure a second communication session with the virtual router of the first autonomous system; learn, from the ASBR via the first communication session, a Border Gateway Protocol Labeled Unicast (BGP-LU) label used to forward traffic from the ASBR of the first autonomous system to a gateway device of a second autonomous system; and send, via the second communication session, the BGP-LU label to the virtual router of the first autonomous system such that the virtual router learns the BGP-LU label used to forward traffic to the gateway device of the second autonomous system.

In another example, a data center within a first autonomous system includes a virtual router of the data center configured to: learn, from a software defined networking (SDN) controller via a first communication session between the SDN controller and the virtual router, a border gateway protocol labeled unicast (BGP-LU) label used to forward traffic from an autonomous system border router (ASBR) of the first autonomous system to a gateway device of a second autonomous system, configure an encapsulated packet destined for the gateway device of the second autonomous system, wherein the encapsulated packet comprises an outer label including the BGP-LU label and an inner label including a VPN label that identifies a tenant interface of the virtual router of the data center, and send, to the ASBR, the encapsulated packet over a tunnel between the virtual router and the ASBR.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
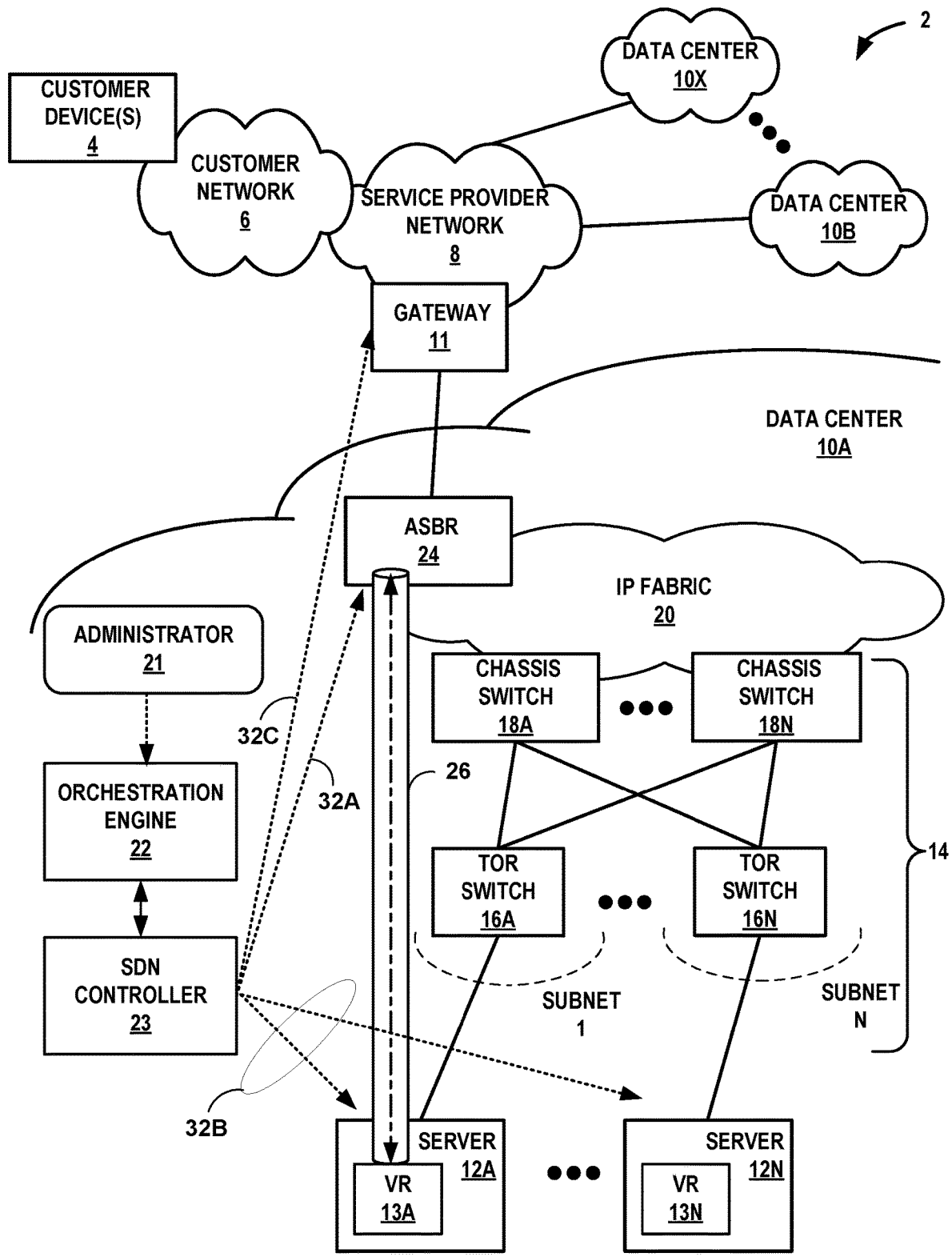
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer network 6 associated with one or more customer devices 4 ("customer devices 4") via a service provider network 8.

In the example of FIG. 1, network system 2 comprises a customer network 6 that provides one or more customers with connectivity to data centers 10 via service provider network 8 and gateway device 11. A customer may represent, for instance, an enterprise, a government, a residential subscriber, or a mobile subscriber. Customer devices 4 may be, for example, personal computers, laptop computers or other types of computing device associated with the customers. In addition, customer devices 4 may comprise mobile devices that access the data services of service provider network 8 via a radio access network (RAN). Example mobile subscriber devices include mobile telephones, laptop or desktop computers having, e.g., a 3G or 4G wireless card, wireless-capable netbooks, video game devise, pagers, smart phones, personal data assistants (PDAs) or the like. Each of customer devices 4 may run a variety of software applications, such as word processing and other office support software, web browsing software, software to support voice calls, video games, video conferencing, and email, among others. In the example of FIG. 1, customer network 6 may operate independently from other networks, such as service provider network 8 and data centers 10.

Service provider network 8 offers packet-based connectivity to customer devices 4 attached to customer network 6 for accessing data centers 10. Service provider network 8 may be coupled to one or more networks administered by other providers, and may thus form part of a large-scale public network infrastructure, e.g., the Internet. Service provider network 8 may implement Multi-Protocol Label Switching (MPLS) forwarding and, in such instances, may be referred to as an MPLS network or MPLS backbone. In some instances, service provider network 8 represents a transit network for a plurality of interconnected autonomous systems that each comprise an independently operated network including at least one border device that communicates with routers in other autonomous systems. Although service provider network 8 is illustrated as a single network between data centers 10 and customer network 6, service provider network 8 may include multiple service provider networks to connect one or more customer devices 4 with data centers 10.

Each of data centers 10 may, for example, host infrastructure equipment, such as networking and storage systems, redundant power supplies, and environmental controls. In some examples, each data center 10 may represent one of many geographically distributed network data centers. In some examples, each of data centers 10 may be individual network servers, network peers, or otherwise. As illustrated in the example of FIG. 1, each of data centers 10 may be a facility that provides network services for customer devices 4. For example, a network data center may host web services for several enterprises and end users. Other example services may include data storage, virtual private networks, traffic engineering, file service, data mining, scientific- or super-computing, and so on. Customer devices 4 connect to gateway device 11 via customer network 6 and service provider network 8 to receive connectivity to services provided by data centers 10. Gateway device 11 redirects traffic flows to and from one or more data centers 10 that provide the network services.

In this example, each of data centers 10 includes a set of storage systems and application servers 12A-12N (collectively, "servers 12") interconnected via high-speed switch fabric 14 provided by one or more tiers of physical network switches and routers. Servers 12 function as compute nodes of the data center. In some examples, the terms "compute nodes" and "servers" are used interchangeably herein to refer to servers 12. For example, each of servers 12 may provide an operating environment for execution of one or more customer-specific virtual machines ("VMs"). Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Although not shown, each of data centers 10 may also include, for example, one or more non-edge switches, routers, hubs, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 8. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customer devices 4 via service provider network 8.

Data centers 10 may include a Software-Defined Network ("SDN") platform to control and manage network behavior. In some cases, an SDN platform includes a logically centralized and physically distributed SDN controller, e.g., SDN controller 23, and a distributed forwarding plane in the form of virtual routers, e.g., virtual routers 13A-13N (collectively, "VRs 13"), that extend the network from physical routers and switches in the data center switch fabric into a virtual overlay network hosted in virtualized servers. SDN controller 23 facilitates operation of one or more virtual networks within each of data centers 10, such as data center 10A, in accordance with one or more examples of this disclosure. Virtual networks are logical constructs implemented on top of the physical network of data center 10A. In some examples, virtual networks may be implemented as a virtual private network (VPN), virtual LAN (VLAN), or the like. In some examples, SDN controller 23 may operate in response to configuration input received from orchestration engine 22, which in turn operates in response to configuration input received from network administrator 21. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, the entire contents of which is set forth herein.

In some examples, orchestration engine 22 manages application-layer functions of data center 10 such as managing compute, storage, networking, and application resources executing on servers 12. For example, orchestration engine 22 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 22 may connect a tenant's virtual network to some external network, e.g. the Internet or a VPN. Orchestration engine 22 may deploy a network service (e.g. a load balancer) in a tenant's virtual network.

In some examples, SDN controller 23 is a lower-level controller tasked with managing the network and networking services of data center 10A and, in particular, switch fabric 14 that provides connectivity between servers 12. SDN controller 23 utilizes a set of communication protocols to configure and control routing and switching elements of switch fabric 14 to create an overlay network, which generally refers to a set of tunnels for transporting packets to and from servers 12 within data center 10A.

One such communication protocol to configure the network (e.g., switch fabric 14, IP fabric 20, etc.) may include a messaging protocol such as Extensible Messaging and Presence Protocol (XMPP), for example. For example, SDN controller 23 implements high-level requests from orchestration engine 22 by configuring physical devices of data centers 10 (e.g. TOR switches 16, chassis switches 18, and switch fabric 14; physical routers; physical service nodes such as firewalls and load balancers; and virtual services such as virtual firewalls in a VM). SDN controller 23 maintains routing, networking, and configuration information within a state database. SDN controller 23 communicates a suitable subset of the routing information and configuration information from the state database to virtual router (VR) agents (not shown) on each of VRs 13 of servers 12.

In the example of FIG. 1, network devices of data center 10A may operate as an independent network (e.g., autonomous system) that provides network services for customer devices 4 of a different autonomous system. Data center 10A includes an Autonomous System Border Router (ASBR) 24 that operates as a gateway to border routers outside the autonomous system. That is, ASBR 24 acts to forward and receive packets between data center 10A and service provider network 8.

In some examples in which MPLS is deployed in service provider network 8 and other potential networks between data center 10A and customer network 6, ASBR 24 may use MPLS encapsulation to forward packets across service provider network 8 to customer network 6. MPLS is a mechanism used to engineer traffic patterns within a network (e.g., a local area network (LAN), a wide area network (WAN), metropolitan area network (MAN), the Internet, etc.), according to routing information maintained by the routers in the network. By utilizing MPLS protocols, such as the Label Distribution Protocol (LDP) or the Resource Reservation Protocol (RSVP) with Traffic Engineering extensions (RSVP-TE), routers can forward traffic along a particular path, i.e., a Label Switched Path (LSP), through a network to a destination device using labels prepended to the traffic. An LSP defines a distinct path through the network to carry MPLS packets from the source device to a destination device. Using an MPLS protocol, each router along an LSP allocates a label associated with the destination and propagates the label to the closest upstream router along the path. Routers along the path add or remove the labels and perform other MPLS operations to forward the MPLS packets along the established path.

ASBR 24 exchanges routing information (e.g., labels) with border routers belonging to other autonomous systems, e.g., gateway device 11, to establish communication sessions with the other autonomous systems. In some examples, ASBR 24 and gateway device 11 may be BGP peers that each implement eBGP to establish a communication session. Using a BGP-Labeled Unicast (BGP-LU) protocol, gateway device 11 may advertise MPLS labels over the communication session to ASBR 24 by mapping MPLS labels (referred to herein as "BGP-LU labels") to routing advertisement messages (e.g., BGP update message). In this way, ASBR 24 may learn the label that may be used to forward traffic to gateway device 11.

In some examples, data center 10A does not implement an MPLS protocol. In these examples, network devices within data center 10A may communicate via a tunnel. In the example of FIG. 1, VR 13A may establish a dynamic tunnel 26 to communicate with ASBR 24. Dynamic tunnel 26 may be a virtual overlay network on top of the physical underlay network within data center 10A.

Dynamic tunnel 26 may differ from a label switched path in that dynamic tunnel 26 does not use, for transporting packets, an MPLS transport label or other label as a transport label that is label swapped through switch fabric 14. Examples of dynamic tunnel 26 may be a Generic Routing Encapsulation (GRE) tunnel or User Datagram Protocol (UDP) tunnel. As one example, when VR 13A receives a data packet (i.e., payload) to be tunneled, VR 13A may send the packet to the tunnel interface. The tunnel interface encapsulates the data packet in a tunneling packet, e.g., GRE packet, to forward the packet to ASBR 24. As one example, a GRE packet may include two headers, one header identifying the data packet as a GRE packet and the second header to provide a new source and destination for the tunnel, e.g., VR 13A and ASBR 24, respectively. The packet may then be forwarded to ASBR 24 based on the header identifying ASBR 24 as the destination of dynamic tunnel 26. ASBR 24 may then de-encapsulate the GRE packet from the data packet and forward the packet toward the final destination.

In some examples, dynamic tunnel 26 may be MPLS-over-GRE (also referred to as MPLSoGRE or MPLS-in-GRE) or MPLS-over-UDP (also referred to as MPLSoUDP or MPLS-in UDP). That is, VRs 13 and ASBR 24 of data center 10A may establish an MPLSoGRE tunnel to tunnel MPLS packets over a non-MPLS network within data center 10A without introducing MPLS into data center 10A. An example implementation of MPLSoUDP is described in "Encapsulating MPLS in UDP," Network Working Group of the Internet Engineering Task Force, Request for Comments 7510, April 2015, which is incorporated by reference in its entirety. An example implementation of MPLSoGRE is described in "Encapsulating MPLS in IP or Generic Routing Encapsulation (GRE)," Network Working Group of the Internet Engineering Task Force, Request for Comments, 4023, March 2005, which is incorporated by reference in its entirety. Other tunnel types include virtual extensible LAN (VXLAN), VXLAN Generic Protocol Extension (VXLAN-GPE), Network Virtualization using Generic Routing Encapsulation (NVGRE), IP-in-IP, as examples.

In the example of FIG. 1, virtual networks of data center 10A may be implemented as a virtual private network (VPN) for customer devices 4. Without the techniques described in this disclosure, a gateway device in one autonomous system typically does not learn the VPN label that identifies the tenant destination of a data center in another autonomous system. For example, a virtual router for the tenant destination of the data center and the gateway device are not BGP peers because the virtual router does not implement BGP. Moreover, although the ASBR for the data center is a BGP peer with gateway device, the ASBR does not maintain or distribute VPN labels. As such, the gateway device may not have knowledge of VPN labels that are used to forward packets toward the virtual router via the ASBR.

Moreover, virtual routers of a first autonomous system typically do not have knowledge of the BGP-LU label that is used to send traffic to a gateway device of the second autonomous system. As further described below, the techniques provide for a controller to facilitate the exchange of appropriate routing labels between endpoints of the different autonomous systems to enable multi-hop exterior Border Gateway Protocol (eBGP) redistribution of VPN labels between different autonomous systems, otherwise referred to as inter-AS option C (as described in E. Rosen, et al., "BGP/MPLS IP Virtual Private Networks (VPNs), Request for Comments 4364, February 2006, the entire contents of which is incorporated by reference herein. That is, the techniques provide for a controller to facilitate the exchange of appropriate routing labels to extend inter-AS services through a non-MPLS data center.

In the example of FIG. 1, SDN controller 23 may facilitate the exchange of routing labels between endpoints of autonomous systems to enable the use of inter-AS services between the endpoints. For example, SDN controller 23 may establish communication sessions 32A-32C ("communication sessions 32") with gateway device 11, ASBR 24, and VRs 13, respectively, to facilitate the exchange of routing labels to enable VR 13A within non-MPLS data center 10A and gateway device 11 to learn of appropriate labels to forward traffic.

As described above, ASBR 24 and gateway device 11 may implement exterior BGP (eBGP) that provides MPLS transport (i.e., a communication session) between ASBR 24 and gateway device 11 of different autonomous systems. ASBR 24 and gateway device 11 may each implement BGP-LU over the communication session to exchange a BGP-LU label that ASBR 24 may use to forward traffic to gateway device 11.

SDN controller 23 may facilitate the exchange of the BGP-LU label with VR 13A such that VR 13A may learn the BGP-LU label to be used when forwarding traffic to gateway device 11 via ASBR 24. For example, SDN controller 23 may configure communication session 32A with ASBR 24 to learn the BGP-LU label that ASBR 24 learned from gateway device 11. In one instance, SDN controller 23 may configure an interior BGP (e.g., iBGP) session with ASBR 24 to learn the BGP-LU label, as further described below with respect to FIG. 2. To share the learned BGP-LU label with VR 13A, SDN controller 23 may also configure communication session 32B with VR 13A to share the BGP-LU label learned from ASBR 24. In one instance, SDN controller 23 may implement a messaging protocol, e.g., XMPP, with VR 13A to share (e.g., download) the BGP-LU label learned from ASBR 24. In this way, VR 13A may learn the appropriate label, i.e., BGP-LU label, to be included in traffic forwarded to gateway device 11 via ASBR 24.

SDN controller 23 may also facilitate the exchange of a VPN label between VR 13A and gateway device 11 such that gateway device 11 may learn the VPN label used to forward traffic to a tenant destination of data center 10A (i.e., a VPN tenant interface within VR 13A). For example, SDN controller 23 may use communication session 32B to learn a VPN label mapped to a VPN tenant interface of VR 13A. In this example, SDN controller 23 may implement XMPP with VR 13A to learn the VPN label. Alternatively, or additionally, SDN controller 23 may learn the VPN label via a BGP session with another SDN controller that is connected to VR 13A via XMPP). To share the VPN label learned from VR 13A, SDN controller 23 may configure communication session 32C with gateway device 11. For example, SDN controller 23 may configure a layer 3 VPN (L3VPN) session with gateway device 11 to share the VPN label learned from VR 13A with gateway device 11, as further described below with respect to FIG. 2. In this way, gateway device 11 may learn the appropriate label, i.e., VPN label, used by VR 13A to forward traffic received from gateway device 11 to a tenant destination of data center 10A.

To forward a data packet destined for devices outside gateway device 11 (e.g., customer devices 4), VR 13A may encapsulate the data packet with a label stack including two labels—an inner VPN label and an outer BGP-LU label (learned from SDN controller 23). The outer BGP-LU label is the label used by ASBR 24 to forward the packet to gateway device 11, and the inner VPN label is the label used by gateway device 11 to forward the packet toward the final destination, e.g., one of customer devices 4.

VR 13A, operating as the tunnel source router for dynamic tunnel 26, may further encapsulate the labeled packet into a tunnel packet (e.g., GRE or UDP packet) and tunnel the tunnel packet to ASBR 24 that is operating as the tunnel destination router. When ASBR 24 receives the packet, ASBR 24 may de-encapsulate the tunnel packet and forward the encapsulated packet to gateway device 11 based on the BGP-LU label that is on the top of the label stack. Gateway device 11 may receive the packet, remove or "pop" the BGP-LU label from the label stack, and send the packet to the destination (e.g., customer devices 4) based on the VPN label that is now on the top of the label stack.

To forward a data packet destined for a tenant destination of data center 10A, gateway device 11 may encapsulate the data packet with an inner VPN label (learned from SDN controller 23) and an outer BGP-LU label learned from ASBR 24. Gateway device 11 may forward the packet to ASBR 24 based on the outer BGP-LU label. When ASBR 24 receives the packet from gateway device 11, ASBR 24 may remove or "pop" the outer BGP-LU label from the label stack such that the packet is now encapsulated with only the VPN label, further encapsulate the packet as a tunnel packet (e.g., GRE or UDP packet), and tunnel the tunnel packet on dynamic tunnel 26 to VR 13A. When VR 13A receives the packet, VR 13A may use the VPN label to identify the VPN tenant interface within VR 13A on which to direct the packet.

During initial setup, ASBR 24 may receive an implicit null label (e.g., a label with a value of 3) from VR 13A that instructs ASBR 24 to remove (or "pop") the outer BGP-LU label from traffic destined for VR 13A before sending the traffic to VR 13A. By receiving the implicit null label, ASBR 24 may remove the outer BGP-LU label from the packet received from gateway device 11 and send the packet to VR 13A without adding or "pushing" any additional labels on the label stack. In this way, ASBR 24 may send the traffic within data center 10A without introducing MPLS within data center 10A.

In this way, the techniques described in this disclosure provide for an SDN controller to facilitate an exchange of routing labels such that an inter-autonomous system (inter-AS) service, e.g., inter-AS option C, is implemented by the SDN controller between virtualized entities of one autonomous system with external entities of a different autonomous system. That is, by facilitating the exchange of routing labels, the SDN controller may enable end-to-end communication between network devices of different autonomous systems.

Although the techniques described in this disclosure are directed toward a solution that avoids introducing MPLS into the data center and extends inter-AS services within the non-MPLS data center, it is recognized that introducing MPLS into the data center may provide additional/alternative examples to perform the techniques described in this disclosure.

For example, virtual routers may implement BGP to peer with ToR switches to perform the techniques described herein. For example, an administrator may configure ToR switches 16 to peer with each virtual router of data center 10A, e.g., VRs 13, such that each of VRs 13 advertises a BGP-LU label for itself. The administrator may implement BGP, e.g., BGP-LU, between ASBR 24 and chassis switches 18; chassis switches 18 and ToR switches 16; and ToR switches 16 and VRs 13.

Alternatively, or additionally, SDN controller 23 may implement BGP from SDN controller 23 to each of ToR switches 16 and XMPP to the virtual routers 13. In one example, VR 13A learns the BGP-LU label from SDN controller 23 via XMPP. Instead of implementing BGP-LU directly to ToR switches 16, ToR switches 16 may advertise different labels for the same BGP-LU destination. SDN controller 23 is configured with knowledge of which of VRs 13 is behind which of ToR switches 16, and may advertise the corresponding ToR's routes to the corresponding virtual routers. In this example, SDN controller 23 may include a routing table (e.g., routing information base) for each of ToR switches 16. Virtual routers 13 connected to ToR switches 16 subscribe to the routing table corresponding to the ToR switch associated with the virtual router.

Figure 2:
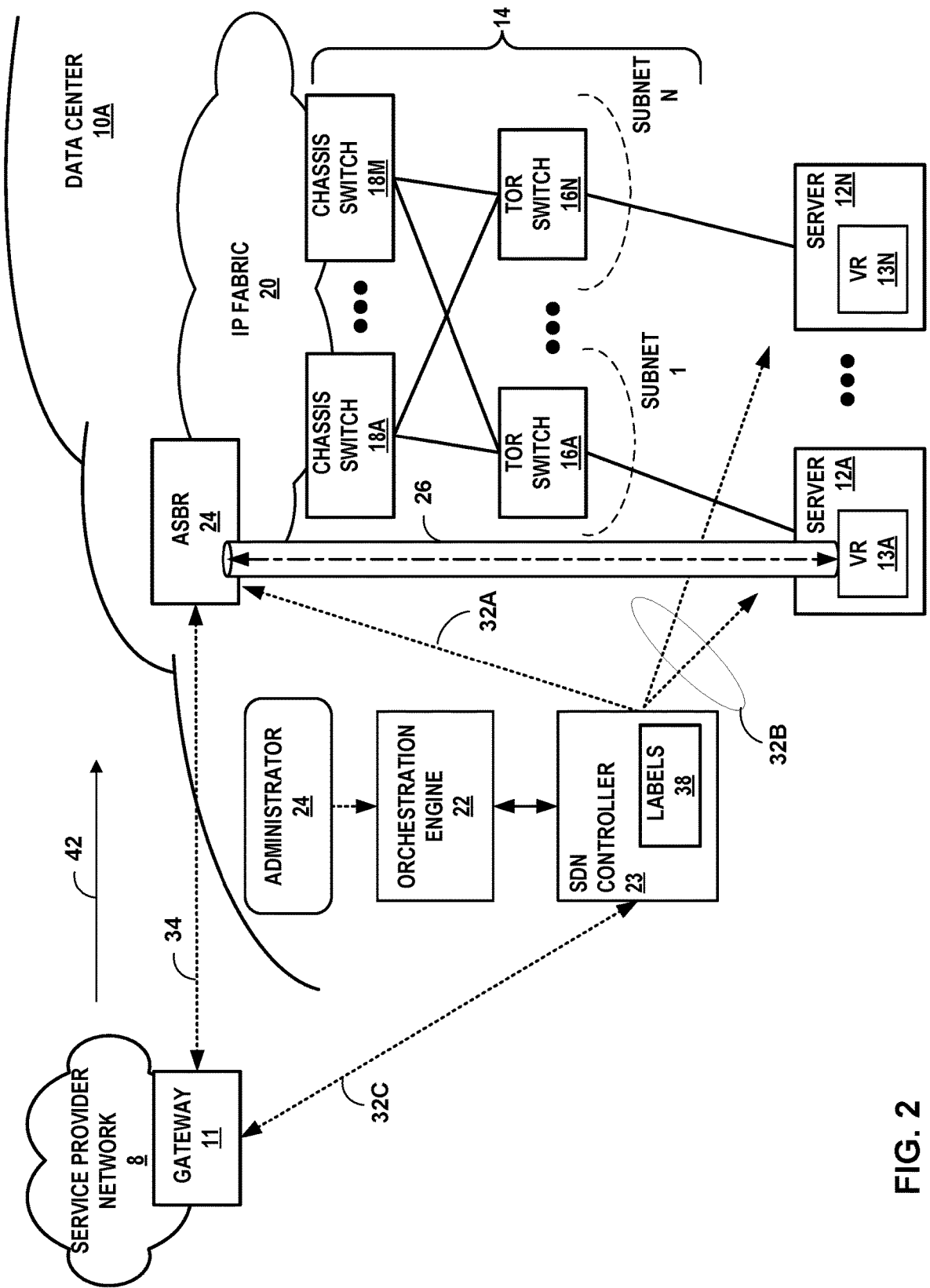
FIG. 2 is a block diagram illustrating an example configuration of communication sessions of FIG. 1 in more detail, in accordance with techniques described in this disclosure.

FIG. 2 is a block diagram illustrating an example configuration of communication sessions 32 of FIG. 1 in more detail, in accordance with techniques described in this disclosure. In the example of FIG. 2, gateway device 11 is a border router of service provider network 8 in one autonomous system and ASBR 24 is a border router of data center 10A in another autonomous system. Gateway device 11 and ASBR 24 may operate as BGP peers and implement communication session 34 to exchange labels between the BGP peers. Communication session 34 may include an exterior BGP session that provides MPLS transport between the BGP peers.

In one instance, gateway device 11 may advertise message 42 (e.g., a BGP update message) to ASBR 24 such that ASBR may use information received in the BGP update messages to construct a graph that describes the relationship of the various autonomous systems of which the BGP peers are members. In some examples, message 42 may include a prefix (referred to as network layer reachability information (NLRI)) that is a network address of the subnet (i.e., the network address of gateway device 11 reachable through a BGP neighbor), and an MPLS label (e.g., a BGP-LU label), mapped to the BGP update message, that ASBR 24 may use to forward traffic to gateway device 11. An example implementation of BGP-LU is described in "Carrying Label Information in BGP-4," IETF Request for Comments 3107, May 2001, which is incorporated by reference in its entirety.

When ASBR 24 receives the advertisement message 42, ASBR 24 may store the routing information, including the BGP-LU label, in a routing table. ASBR 24 may also store local routing information that BGP applies to routes because of local policies and information that BGP advertises to BGP peers in route advertisement messages.

In the example of FIG. 2, SDN controller 23 may establish communication session 32A with ASBR 24 to learn the BGP-LU label. For example, SDN controller 23, which may operate within the same autonomous system as data center 10A, may establish communication session 32A that comprises an internal BGP (iBGP) session with ASBR 24. SDN controller 23 may configure an iBGP session with ASBR 24 such that SDN controller 23 may learn of the BGP-LU label that ASBR 24 learned from the routing advertisement message from gateway device 11. For example, SDN controller 23 may use the iBGP session 32A to receive from ASBR 24 a BGP update message including the BGP-LU label.

SDN controller 23 may store the BGP-LU label learned from ASBR 24 in a routing table that comprises labels (referred to herein as "labels 38" or "labels table 38") that may be used to forward traffic to endpoints of different autonomous systems. As further described below with respect to FIG. 5, labels table 38 may comprise address family information (e.g., BGP-LU address family information) and encapsulation information (referred to herein as "Default Tunnel Encapsulation List (DTEL)"). Address family information may include BGP-LU address family information of gateway device 11, ASBR 24, and VRs 13. The DTEL may include the BGP-LU labels learned from ASBR 24 and VPN labels learned from virtual routers 13, respectively. That is, the DTEL may provide the encapsulation information for which VR 13A and gateway device 11 may use to forward traffic.

SDN controller 23 may also establish communication session 32B with one or more VRs 13, e.g., VR 13A, to share the BGP-LU label learned from ASBR 24 with VR 13A. For example, SDN controller 23 may establish communication session 32B that comprises an Extensible Messaging and Presence Protocol (XMPP) session with VR 13A. SDN controller 23 may use XMPP as a general-purpose message bus between virtual routers and SDN controller 23 to exchange multiple types of information such as routes, configuration, operational state, statistics, logs, and events. In the example of FIG. 2, SDN controller 23 may use XMPP to send the BGP-LU label learned from ASBR 24 (that is stored in labels table 38) to VR 13A. SDN controller 23 may, in some instances, configure routes that include the BGP-LU label learned from ASBR 24. In this way, SDN controller 23 may facilitate the exchange of the BGP-LU label learned from ASBR 24 to VR 13A.

SDN controller 23 may use communication session 32B with VR 13A to learn a VPN label that may identify a tenant destination within data center 10A for which VR 13A is to forward traffic. For example, SDN controller 23 may use the XMPP session with VR 13A to receive the VPN label that identifies a VPN tenant interface within VR 13A. SDN controller 23 may store the VPN label learned from VR 13A within labels table 38.

SDN controller 23 may establish communication session 32C with gateway device 11 to share the VPN label learned from VR 13A. In one instance, SDN controller 23 may establish communication session 32C that comprises an L3VPN session with gateway device 11. SDN controller 23 may configure an L3VPN session with gateway device 11 to share the VPN label learned from VR 13A with gateway device 11. Using L3VPN, SDN controller 23 may configure a route to send the VPN label learned from VR 13A (that is stored in labels table 38) to gateway device 11 such that gateway device 11 may use the VPN label when encapsulating traffic destined for VR 13A. In this way, SDN controller 23 may facilitate the exchange of the VPN label learned from VR 13A to gateway device 11.

Figure 3:
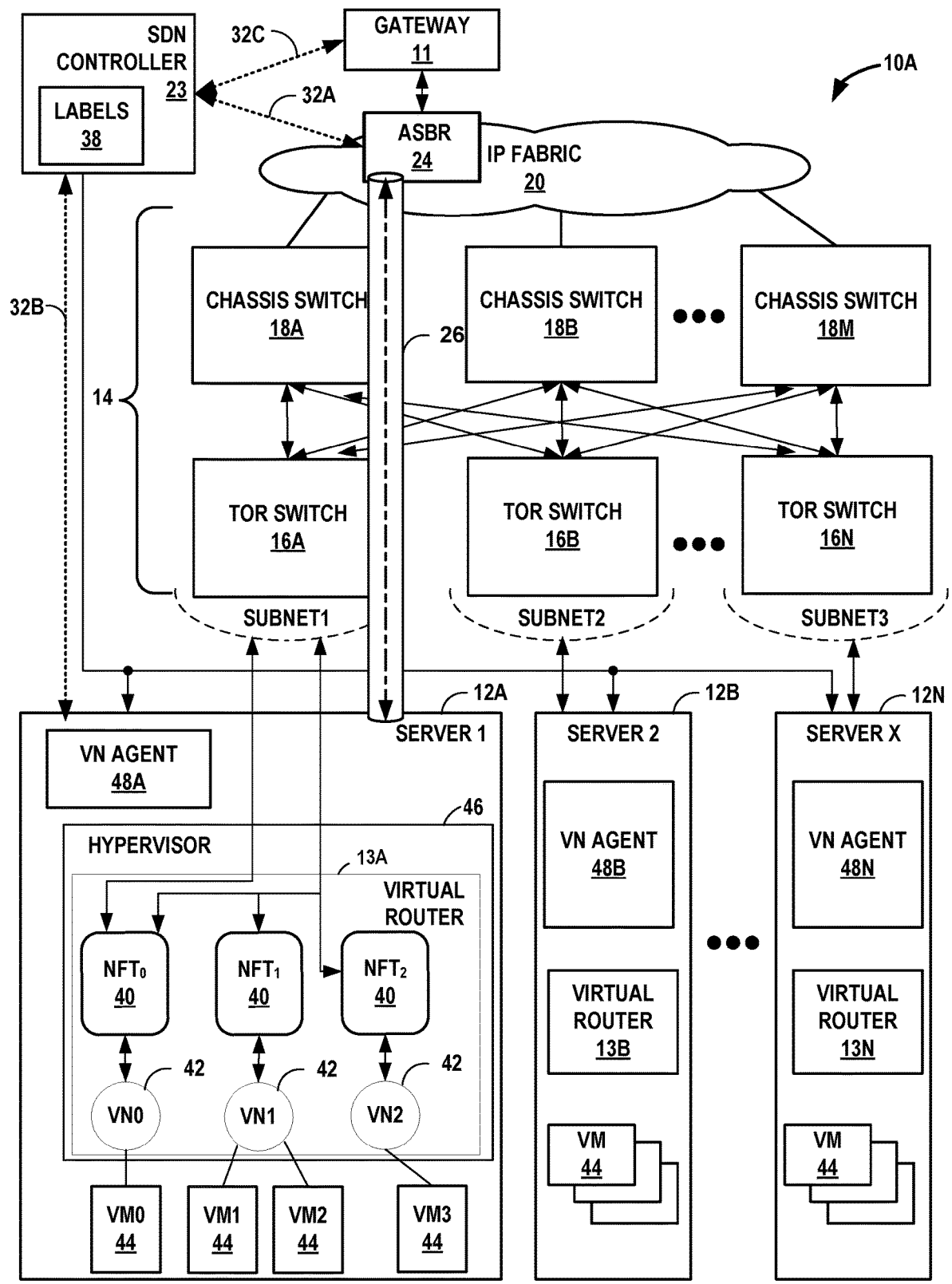
FIG. 3 is a block diagram illustrating an example implementation of the data center of FIG. 1 in further detail, according to the techniques described herein.

FIG. 3 is a block diagram illustrating an example implementation of data center 10A of FIG. 1 in further detail. In the example of FIG. 3, data center 10A includes interconnections that extend switch fabric 14 from physical switches 16, 18 to software or "virtual" routers 13A-13N (collectively, "virtual routers 13"). Virtual routers 13 dynamically create and manage one or more virtual networks 42 usable for communication between application instances. In one example, virtual routers 13 execute the virtual network as an overlay network, which provides the capability to decouple an application's virtual address from a physical address (e.g., IP address) of the one of servers 12A-12N ("servers 12") on which the application is executing. Each virtual network may use its own addressing and security scheme and may be viewed as orthogonal from the physical network and its addressing scheme. Various techniques may be used to transport packets within and across virtual networks 42 over the physical network.

Each virtual router 13 may execute within a hypervisor, a host operating system or other component of each of servers 12. Each of servers 12 may represent an x86 or other general-purpose or special-purpose server capable of executing virtual machines 44. In the example of FIG. 3, virtual router 13A executes within hypervisor 46, also often referred to as a virtual machine manager (VMM), which provides a virtualization platform that allows multiple operating systems to concurrently run on one of servers 12. In the example of FIG. 3, virtual router 13A manages virtual networks 42, each of which provides a network environment for execution of one or more virtual machines (VMs) 44 on top of the virtualization platform provided by hypervisor 46. Each VM 44 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 44 may represent containers, another form of virtualized execution environment. That is, both virtual machines and containers are examples of virtualized execution environments for executing application workloads.

In general, each VM 44 may be any type of software application and may be assigned a virtual address for use within a corresponding virtual network 42, where each of the virtual networks may be a different virtual subnet provided by virtual router 13A. A VM 44 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A.

In one implementation, each of servers 12 includes a corresponding one of virtual network (VN) agents 48A-48N (collectively, "VN agents 48") that controls virtual networks 42 and that coordinates the routing of data packets within server 12. In general, each VN agent 48 communicates with virtual SDN controller 23, which generates commands to control routing of packets through data center 10A. VN agents 48 may operate as a proxy for control plane messages between virtual machines 44 and SDN controller 23. For example, a VM 44 may request to send a message using its virtual address via the VN agent 48A, and VN agent 48A may in turn send the message and request that a response to the message be received for the virtual address of the VM 44 that originated the first message. In some cases, a VM 44 may invoke a procedure or function call presented by an application programming interface of VN agent 48A, and the VN agent 48A may handle encapsulation of the message as well, including addressing.

In one example, network packets, e.g., layer three (L3) IP packets or layer two (L2) Ethernet packets generated or consumed by the instances of applications executed by virtual machines 44 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet."

Encapsulation and/or de-capsulation of virtual network packets within physical network packets may be performed within virtual routers 13, e.g., within the hypervisor or the host operating system running on each of servers 12. This functionality is referred to herein as tunneling and may be used within data center 10A to create one or more tunnels for communication between servers 12 and ASBR 24. For example, virtual routers 13 may use MPLSoUDP or MPLSoGRE to reach ASBR 24 to avoid introducing MPLS within data center 10A. As further described below, virtual routers 13 may further encapsulate a data packet received from one of VMs 44 with a label stack having two labels—an outer BGP-LU label (learned from SDN gateway 23) and an inner VPN label that identifies the VPN tenant interface to the final destination of the packet, in accordance with the techniques described herein.

As noted above, SDN controller 23 provides a logically centralized controller for facilitating operation of one or more virtual networks within data center 10A. SDN controller 23 may, for example, maintain a routing information base, e.g., one or more routing tables that store routing information for the physical network as well as one or more networks of data center 10A. SDN controller 23 may include labels table 38 that stores labels learned from endpoints of autonomous systems, such as ASBR 24 and VRs 13. Similarly, switches 16, 18 and virtual routers 13 maintain routing information, such as one or more routing and/or forwarding tables. In one example implementation, virtual router 13A of hypervisor 46 implements a network forwarding table (NFT) 40 for each virtual network 42. In general, each NFT 40 stores forwarding information for the corresponding virtual network 42 and identifies where data packets are to be forwarded and whether the packets are to be encapsulated in a tunneling protocol, such as with a tunnel header that may include one or more headers for different layers of the virtual network protocol stack.

In accordance with the techniques described herein, SDN controller 23 may facilitate the exchange of labels learned from different endpoints of different autonomous systems to enable forwarding of traffic between the different autonomous systems. For example, SDN controller 23 may establish a communication session 32A, e.g., interior BGP session, with ASBR 24 to learn a BGP-LU label that ASBR 24 learned from a routing advertisement message received from gateway device 11. SDN controller 23 may store the BGP-LU label in labels table 38. SDN controller 23 may configure XMPP session 32B with VN agent 48A to send the BGP-LU label learned from ASBR 24 (that is stored in labels table 38) to virtual router 13A. Virtual router 13A may store the BGP-LU label received from SDN controller 23 in one or more of NFTs 40. In this way, virtual router 13A may learn the BGP-LU label that may be used to encapsulate outgoing traffic sent to gateway device 11 via ASBR 24.

SDN controller 23 may also use the XMPP session 32B to learn a VPN label that identifies a VPN tenant interface to one of VMs 44 of virtual router 13A. As one example, SDN controller 23 may configure an XMPP session 32B with VN agent 48A to learn of the VPN label. In another example, another SDN controller may be connected with VN agent 48A via XMPP. In this example, SDN controller 23 may configure a BGP session with the other SDN controller to learn the VPN label. SDN controller 23 may store the VPN label learned from VN agent 48A in labels table 38. SDN controller may also establish communication session 32C, e.g., an L3VPN session, with gateway device 11 to send the VPN label learned from virtual router 13A (that is stored in labels table 38) to gateway device 11.

Figure 4:
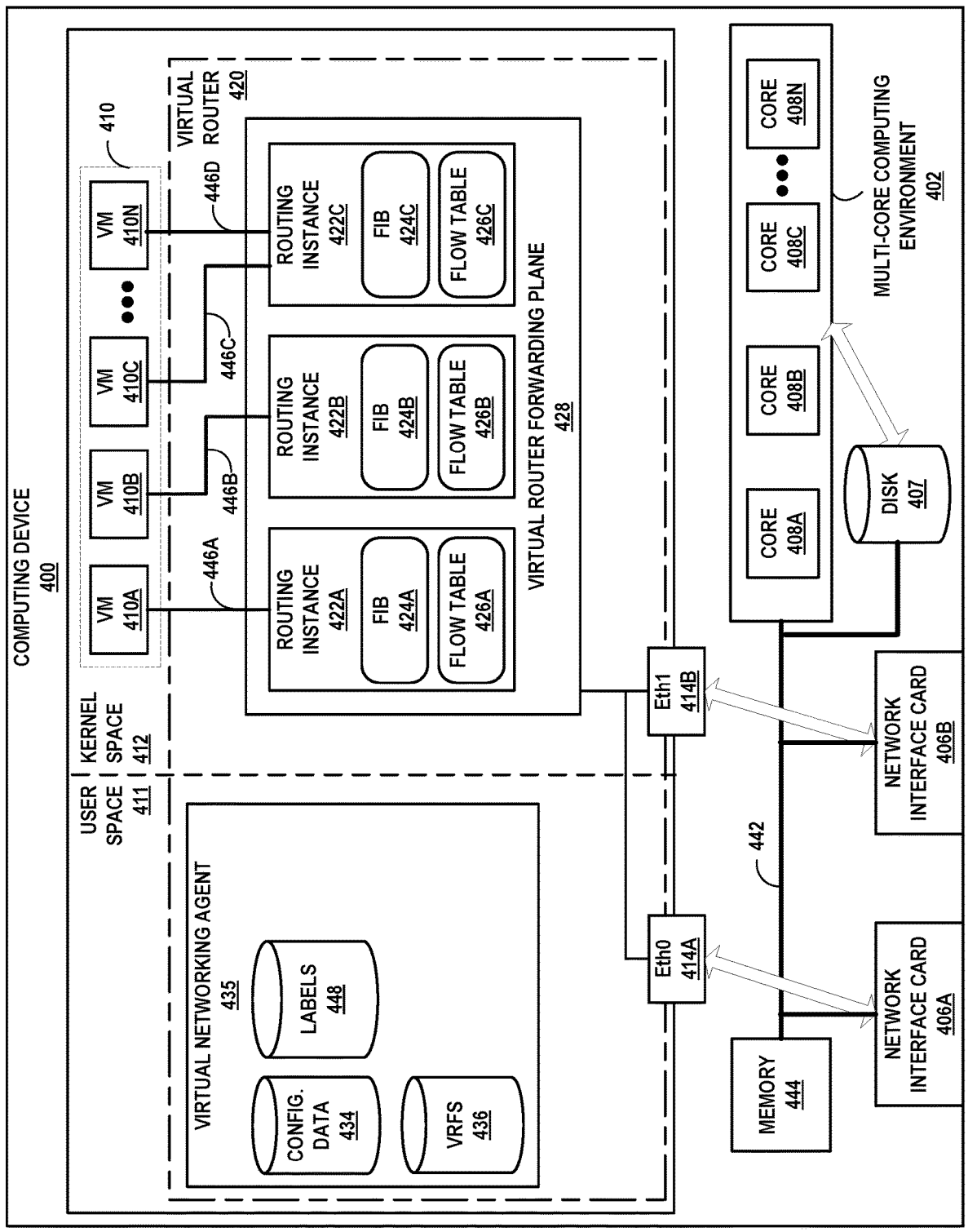
FIG. 4 is a block diagram illustrating a computing device that executes an example virtual router for virtual networks according to techniques described herein.

FIG. 4 is a block diagram illustrating an example computing device 400 that executes a virtual router 420 for virtual networks according to techniques described herein. Computing device 400 may represent any of servers 12 of FIGS. 1-3 or other network devices, such as any of TOR switches 16.

In the example of FIG. 4, computing device 400 includes a system bus 442 coupling hardware components of a computing device 400 hardware environment. System bus 442 couples memory 444, network interface cards (NICs) 406A-406B (collectively, "NICs 406"), storage disk 407, and multi-core computing environment 402 having a plurality of processing cores 408A-408N (collectively, "processing cores 408"). Network interface cards 406 include interfaces configured to exchange packets using links of an underlying physical network. Multi-core computing environment 402 may include any number of processors and any number of hardware cores from, for example, four to thousands. Each of processing cores 408 each includes an independent execution unit to perform instructions that conform to an instruction set architecture for the core. Processing cores 408 may each be implemented as separate integrated circuits (ICs) or may be combined within one or more multi-core processors (or "many-core" processors) that are each implemented using a single IC (i.e., a chip multiprocessor).

Disk 407 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 408.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 444 provides a physical address space composed of addressable memory locations.

Memory 444 may in some examples present a non-uniform memory access (NUMA) architecture to multi-core computing environment 402. That is, cores 408 may not have equal memory access time to the various storage media that constitute memory 444. Cores 408 may be configured in some instances to use the portions of memory 444 that offer the lowest memory latency for the cores to reduce overall memory latency.

In some instances, a physical address space for a computer-readable storage medium may be shared among one or more cores 408 (i.e., a shared memory). For example, cores 408A, 408B may be connected via a memory bus (not shown) to one or more DRAM packages, modules, and/or chips (also not shown) that present a physical address space accessible by cores 408A, 408B. While this physical address space may offer the lowest memory access time to cores 408A, 408B of any of portions of memory 444, at least some of the remaining portions of memory 444 may be directly accessible to cores 408A, 408B. One or more of cores 408 may also include an L1/L2/L3 cache or a combination thereof. The respective caches for cores 408 offer the lowest-latency memory access of any of storage media for the cores 408.

Memory 444, NICs 406, storage disk 107, and multi-core computing environment 402 provide an operating environment for a software stack that executes a virtual router 420 and one or more virtual machines 410A-410N (collectively, "virtual machines 410"). Virtual machines 410 may represent example instances of any of virtual machines 44 of FIG. 3. The computing device 400 partitions the virtual and/or physical address space provided by main memory 444 and in the case of virtual memory by disk 407 into user space 411, allocated for running user processes, and kernel space 412, which is protected and generally inaccessible by user processes. An operating system kernel (not shown in FIG. 4) may execute in kernel space 412 and may include, for example, a Linux, Berkeley Software Distribution (BSD), another Unix-variant kernel, or a Windows server operating system kernel, available from Microsoft Corp. Computing device 400 may in some instances execute a hypervisor (such as hypervisor 46 of FIG. 3) to manage virtual machines 410. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 424 may execute the virtual router 420.

Eth0 414A and Eth1 414B represent devices according to a software device model and provide device driver software routines for handling packets for receipt/transmission by corresponding NICs 406. Packets received by NICs 406 from the underlying physical network fabric for the virtual networks may include an "outer packet" to allow the physical network fabric to tunnel the payload or "inner packet" to a physical network address for one of NICs 406. The outer packet may include not only the physical network address, but also a Multiprotocol Label Switching (MPLS) label or virtual network identifier such as VxLAN tag that identifies one of the virtual networks as well as the corresponding routing instance. The inner packet includes an inner header having a destination network address that conforms to the virtual network addressing space for the virtual network identified by the virtual network identifier. For example, virtual router forwarding plane 428 may receive by Eth1 414B from NIC 406 a packet having an outer header that includes an MPLS label associated with virtual router forwarding plane 428 with routing instance 422A. The packet may have an inner header having a destination network address that is a destination address of VM 410A that taps, via tap interface 446A, into routing instance 422A.

Virtual router 420 in this example includes a kernel space 412 module: virtual router forwarding plane 428, as well as a user space 411 module: virtual networking agent (VN agent) 435. Virtual router forwarding plane 428 executes the "forwarding plane" or packet forwarding functionality of the virtual router 420 and VN agent 435 executes the "control plane" functionality of the virtual router 420. VN agent 435 may represent an example instance of any of VN agents 48 of FIG. 3.

Virtual router forwarding plane 428 includes multiple routing instances 422A-422C (collectively, "routing instances 422") for corresponding virtual networks. Each of routing instances 422 includes a corresponding one of forwarding information bases (FIBs) 424A-424C (collectively, "FIBs 424") and flow tables 426A-426C (collectively, "flow tables 426"). Although illustrated as separate data structures, flow tables 426 may in some instances be logical tables implemented as a single table or other associative data structure in which entries for respective flow tables 426 are identifiable by the virtual network identifier (e.g., a VRF identifier such as VxLAN tag or MPLS label). FIBs 424 include lookup tables that map destination addresses to destination next hops. The destination addresses may include layer 3 network prefixes or layer 2 MAC addresses. Flow tables 426 enable application of forwarding policies to flows. Each of flow tables 426 includes flow table entries that each match one or more flows that may traverse virtual router forwarding plane 428 and include a forwarding policy for application to matching flows.

In this example, VN agent 435 may be a user space 411 process executed by computing device 400. VN agent 435 includes configuration data 434, virtual routing and forwarding instances configurations 436 ("VRFs 436"), and labels table 448 ("labels 448"). VN agent 435 exchanges control information with one or more virtual network controllers (e.g., SDN controller 23 of FIGS. 1-3). Control information may include, virtual network routes, low-level configuration state such as routing instances for installation to configuration data 434 and VRFs 436.

In accordance with the techniques described herein, VN agent 435 may communicate with SDN controller 23, e.g., via XMPP, to learn BGP-LU labels that ASBR 24 learned from BGP peer gateway device 11. For example, VN agent 435 may receive from SDN controller 23 the BGP-LU labels that SDN controller 23 learned from ASBR 24 and store the BGP-LU labels in labels table 448. For example, in response to learning the BGP-LU labels, SDN controller 23 may use XMPP to download the BGP-LU labels to VN agent 435. When one of VMs 410 generates a data packet destined for an external entity of a different autonomous system, VN agent 435 may perform a lookup of labels table 448 to determine the encapsulation information for the outgoing packet. As one example, VN agent 435 may determine from the labels table 448 that the outgoing data packet is to be encapsulated with a BGP-LU label that causes an ASBR (e.g., ASBR 24 of FIG. 1) communicating with virtual router 420 to forward the packet to a BGP peer gateway device (e.g., gateway device 11 of FIG. 1) of a different autonomous system.

In some examples, VN agent 435 may also store within labels table 448 respective VPN labels that identify respective VPN tenant interfaces to corresponding VMs 410 of virtual router 420. VN agent 435 may also communicate with SDN controller 23, e.g., via XMPP, to share the VPN labels stored in labels table 448 such that SDN controller 23 may share with gateway device 11 a VPN label that the SDN controller 23 learned from VN agent 435. In this way, gateway device 11 may encapsulate packets destined for one of VMs 410 with the VPN label learned from SDN controller 23.

Figure 5:
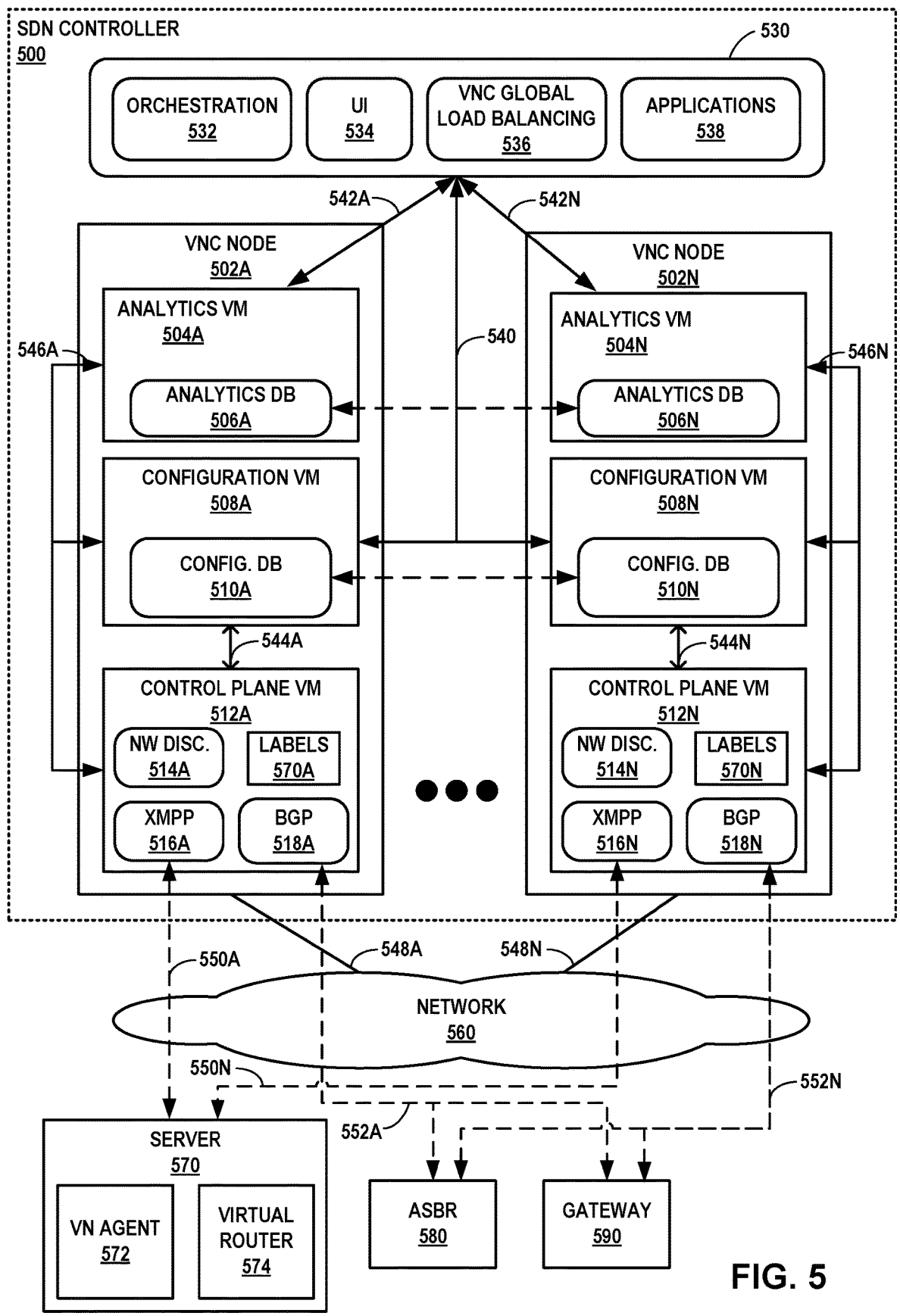
FIG. 5 is a block diagram illustrating a computing device that executes an example controller, in accordance with the techniques described herein.

FIG. 5 is a block diagram illustrating a computing device that executes an example SDN controller, in accordance with the techniques described herein. SDN controller 500 may, for example, correspond to SDN controller 23 of FIGS. 1-3.

SDN controller 500 of FIG. 5 illustrates a distributed implementation of a virtual network controller (VNC) that includes multiple VNC nodes 502A-502N (collectively, "VNC nodes 502") to execute the functionality of SDN controller 500, including managing the operation of virtual routers for one or more virtual networks implemented within the data center. Each of VNC nodes 502 may represent a different server of the data center, e.g., any of servers 12 of FIGS. 1-3, or alternatively, a server or controller coupled to the IP fabric by, e.g., an edge router of a service provider network or a customer edge device of the data center network. In some instances, some of VNC nodes 502 may execute as separate virtual machines on the same server.

Each of VNC nodes 502 may control a different, non-overlapping set of data center elements, such as servers, individual virtual routers executing within servers, individual interfaces associated with virtual routers, chassis switches, TOR switches, and/or communication links. VNC nodes 502 peer with one another according to a peering protocol operating over network 560. Network 560 may represent an example instance of switch fabric 14 and/or IP fabric 20 of FIG. 1. In the illustrated example, VNC nodes 502 peer with one another using a Border Gateway Protocol (BGP) implementation, an example of a peering protocol. In this sense, VNC nodes 502A and 502N may represent a first controller node device and a second controller node device, respectively, peered using a peering protocol. VNC nodes 502 include respective network discovery modules 514A-514N to discover network elements of network 560.

VNC nodes 502 provide, to one another using the peering protocol, information related to respective elements of the virtual network managed, at least in part, by the VNC nodes 502. For example, VNC node 502A may manage a first set of one or more servers operating as virtual routers for the virtual network. VNC node 502A may send information relating to the management or operation of the first set of servers to VNC node 502N by BGP 518A. Other elements managed by VNC nodes 502 may include network controllers and/or appliances, network infrastructure devices (e.g., L2 or L3 switches), communication links, firewalls, and VNC nodes 502, for example. Because VNC nodes 502 have a peer relationship, rather than a master-slave relationship, information may be sufficiently easily shared the VNC nodes 502. In addition, hardware and/or software of VNC nodes 502 may be sufficiently easily replaced, providing satisfactory resource fungibility.

Each of VNC nodes 502 may include substantially similar components for performing substantially similar functionality, said functionality being described hereinafter primarily with respect to VNC node 502A. VNC node 502A may include an analytics database 506A for storing diagnostic information related to a first set of elements managed by VNC node 502A. VNC node 502A may share at least some diagnostic information related to one or more of the first set of elements managed by VNC node 502A and stored in analytics database 506, as well as to receive at least some diagnostic information related to any of the elements managed by others of VNC nodes 502. Analytics database 506A may represent a distributed hash table (DHT), for instance, or any suitable data structure for storing diagnostic information for network elements in a distributed manner in cooperation with others of VNC nodes 502.

VNC node 502A may include a configuration database 510A for storing configuration information related to a first set of elements managed by VNC node 502A. Control plane components of VNC node 502A may store configuration information to configuration database 510A using interface 544A, which may represent an Interface for Metadata Access Points (IF-MAP) protocol implementation. VNC node 502A may share at least some configuration information related to one or more of the first set of elements managed by VNC node 502A and stored in configuration database 510A, as well as to receive at least some configuration information related to any of the elements managed by others of VNC nodes 502. Configuration database 510A may represent a distributed hash table (DHT), for instance, or any suitable data structure for storing configuration information for network elements in a distributed manner in cooperation with others of VNC nodes 502.

SDN controller 500 may perform any one or more of the illustrated virtual network controller operations represented by modules 530, which may include orchestration 532, user interface 534, VNC global load balancing 536, and one or more applications 538. SDN controller 500 executes orchestration module 532 to facilitate the operation of one or more virtual networks in response to a dynamic demand environment by, e.g., spawning/removing virtual machines in data center servers, adjusting computing capabilities, allocating network storage resources, and modifying a virtual topology connecting virtual routers of a virtual network. VNC global load balancing 536 executed by SDN controller 500 supports load balancing of analytics, configuration, communication tasks, e.g., among VNC nodes 502. Applications 538 may represent one or more network applications executed by VNC nodes 502 to, e.g., change topology of physical and/or virtual networks, add services, or affect packet forwarding.

User interface 534 includes an interface usable by an administrator (or software agent) to control the operation of VNC nodes 502. For instance, user interface 534 may include methods by which an administrator may modify, e.g. configuration database 510A of VNC node 502A. Administration of the one or more virtual networks operated by SDN controller 500 may proceed by uniform user interface 134 that provides a single point of administration, which may reduce an administration cost of the one or more virtual networks.

VNC node 502A may include a control plane virtual machine (VM) 512A that executes control plane protocols to facilitate the distributed VNC techniques. Control plane VM 512A may in some instances represent a native process. Control VM 512A executes BGP 518A to provide information related to the first set of elements managed by VNC node 502A to, e.g., control plane virtual machine 512N of VNC node 502N. Control plane VM 512A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 512A-512N) may execute different software versions. In one or more aspects, e.g., control plane VM 512A may include a type of software of a particular version, and the control plane VM 512N may include a different version of the same type of software. The peering configuration of the control node devices may enable use of different software versions for the control plane VMs 512A-512N. The execution of multiple control plane VMs by respective VNC nodes 502 may prevent the emergence of a single point of failure.

Control plane VM 512A communicates with virtual routers, e.g., illustrated virtual router 574 executed by server 570, using a communication protocol operating over network 560. Virtual routers facilitate overlay networks in the one or more virtual networks. In the illustrated example, control plane VM 512A uses Extensible Messaging and Presence Protocol (XMPP) 516A to communicate with at least virtual router 574 by XMPP interface 550A. Virtual router data, statistics collection, logs, and configuration information may in accordance with XMPP 516A be sent as XML documents for communication between control plane VM 512A and the virtual routers. Control plane VM 512A may in turn route data to other XMPP servers (such as an analytics collector) or may retrieve configuration information on behalf of one or more virtual routers. Control plane VM 512A may further execute a communication interface 544A for communicating with configuration virtual machine (VM) 508A associated with configuration database 510A. Communication interface 544A may represent an IF-MAP interface.

VNC node 502A may further include configuration VM 508A to store configuration information for the first set of elements in configuration database 110A. Configuration VM 508A, although described as a virtual machine, may in some aspects represent a native process executing on an operating system of VNC node 502A. Configuration VM 508A and control plane VM 512A may communicate using IF-MAP by communication interface 544A and using XMPP by communication interface 546A. In some aspects, configuration VM 508A may include a horizontally scalable multi-tenant IF-MAP server and a distributed hash table (DHT)-based IF-MAP database that represents configuration database 510A. In some aspects, configuration VM 508A may include a configuration translator, which may translate a user friendly higher-level virtual network configuration to a standards based protocol configuration (e.g., a BGP L3VPN configuration), which may be stored using configuration database 510A.

Communication interface 540 may include an IF-MAP interface for communicating with other network elements. The use of the IF-MAP may make the storage and management of virtual network configurations very flexible and extensible given that the IF-MAP schema can be dynamically updated. Advantageously, aspects of SDN controller 500 may be flexible for new applications 538.

VNC node 502A may further include an analytics virtual machine (VM) 504A to store diagnostic information (and/or visibility information) related to at least the first set of elements managed by VNC node 502A. Control plane VM and analytics VM 504 may communicate using an XMPP implementation by communication interface 546A. Analytics VM 504A, although described as a virtual machine, may in some aspects represent a native process executing on an operating system of VNC node 502A.

Analytics VM 504A may include analytics database 506A, which may represent an instance of a distributed database that stores visibility data for virtual networks. Visibility information may describe visibility of both distributed SDN controller 500 itself and of customer networks. The distributed database may include an XMPP interface on a first side and a REST/JSON/XMPP interface on a second side.

Virtual router 574 may implement the layer 3 forwarding and policy enforcement point for one or more end points and/or one or more hosts. The one or more end points and/or one or more hosts may be classified into a virtual network due to configuration from control plane VM 512A. Control plane VM 512A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual router 574 may be agnostic to actual tunneling encapsulation used. Virtual router 574 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 502 may be provided by different suppliers. However, the peering configuration of VNC nodes 502 may enable use of different hardware and/or software provided by different suppliers for implementing the VNC nodes 502 of distributed SDN controller 500. A system operating according to the techniques described above may provide logical view of network topology to end-host irrespective of physical network topology, access type, and/or location. Distributed SDN controller 100 provides programmatic ways for network operators and/or applications to change topology, to affect packet forwarding, and/or to add services, as well as horizontal scaling of network services, e.g. firewall, without changing the end-host view of the network.

Control plane VMs 512 may request the servers 12 return a physical path through a virtual network for a network flow. Upon control plane VMs 512 receiving a physical path, corresponding analytics VMs 504 may store the physical path to corresponding analytics databases 506. In some instances, any of VNC nodes 502 may determine a physical path through virtual network for a network flow using techniques described herein as being performed by a server 12.

In accordance with various aspects of the techniques described in this disclosure, control plane VM 512A may use BGP 518A, such as BGP-LU, to communicate with ASBR 580 and gateway device 590. ASBR 580 may correspond with ASBR 24 of FIGS. 1-3 and gateway device 590 may correspond with gateway device 11 of FIGS. 1-3. In the example of FIG. 5, control plane VM 512A may use communication protocols to establish communication sessions with endpoints of autonomous systems. For example, control plane VM 512A may use BGP 518A to establish an internal BGP session with ASBR 580—that is within the same autonomous system as virtual router 574—to learn BGP-LU labels that ASBR 580 learned from routing advertisement messages exchanged with gateway device 590. Control plane VM 512A may store the learned BGP-LU labels in labels table 570A.

Control plane VM 512A may use XMPP 516A to share the BGP-LU labels SDN controller 500 learned from ASBR 580 with virtual router 574. For example, control plane VM 512A may retrieve the learned BGP-LU labels from labels table 570A and may use XMPP 516A to communicate with VN agent 572 via XMPP interface 550A to share (e.g., download) the learned BGP-LU labels. In this way, VN agent 572 may learn the BGP-LU labels that are used to forward traffic to gateway device 590 via ASBR 580.

Control plane VM 512A may also use XMPP 516A to learn VPN labels from virtual router 574. For example, control plane VM 512A may use XMPP 516A to communicate with VN agent 572 to receive VPN labels associated with virtual router 574. Control plane VM 512A may store the VPN labels in labels table 570A.

Control plane VM 512A may use BGP 518A to establish, e.g., an L3VPN session with gateway device 590 to share the VPN labels learned from VN agent 572 with gateway device 590. For example, control plane VM 512A may retrieve the learned VPN labels from labels table 570A and may use BGP 518A to communicate with gateway device 590 via BGP interface 552A to send the VPN labels to gateway device 590. In this way, gateway device 590 may learn the VPN labels used to forward packets to virtual router 574 via ASBR 580.

In some examples, labels table 570A-570N (collectively, "labels table 570") may represent a distributed hash table (DHT), for instance, or any suitable data structure for storing label information for network elements in a distributed manner. Labels table 570 may include address family information (e.g., BGP-LU address family information) and encapsulation information (referred to herein as Default Tunnel Encapsulation List (DTEL)). Address family information may include the BGP/MPLS addresses of endpoints of autonomous systems (e.g., virtual router 574, ASBR 580, and gateway device 590). DTEL may include tunnel encapsulation information for VPN routes per address family. Control plane VM 512A may send the address family information and DTEL from labels table 570A to VN agent 572 such that VN agent 572 may use the address family information to determine the virtual host (vhost) addresses for which to forward/receive traffic, and the DTEL to determine the VPN routes. Additionally, control plane VM 512A may send the address family information and DTEL from labels table 570A to gateway device 590. Gateway device 590 may determine from the DTEL the VPN routes for which to forward packets destined for a virtual machine of virtual router 574. In some examples, the routing table (e.g., inet.3 table) holds the labeled unicast routes, and the DTEL holds the tunnel encapsulation for the VPN routes.

Figure 6:
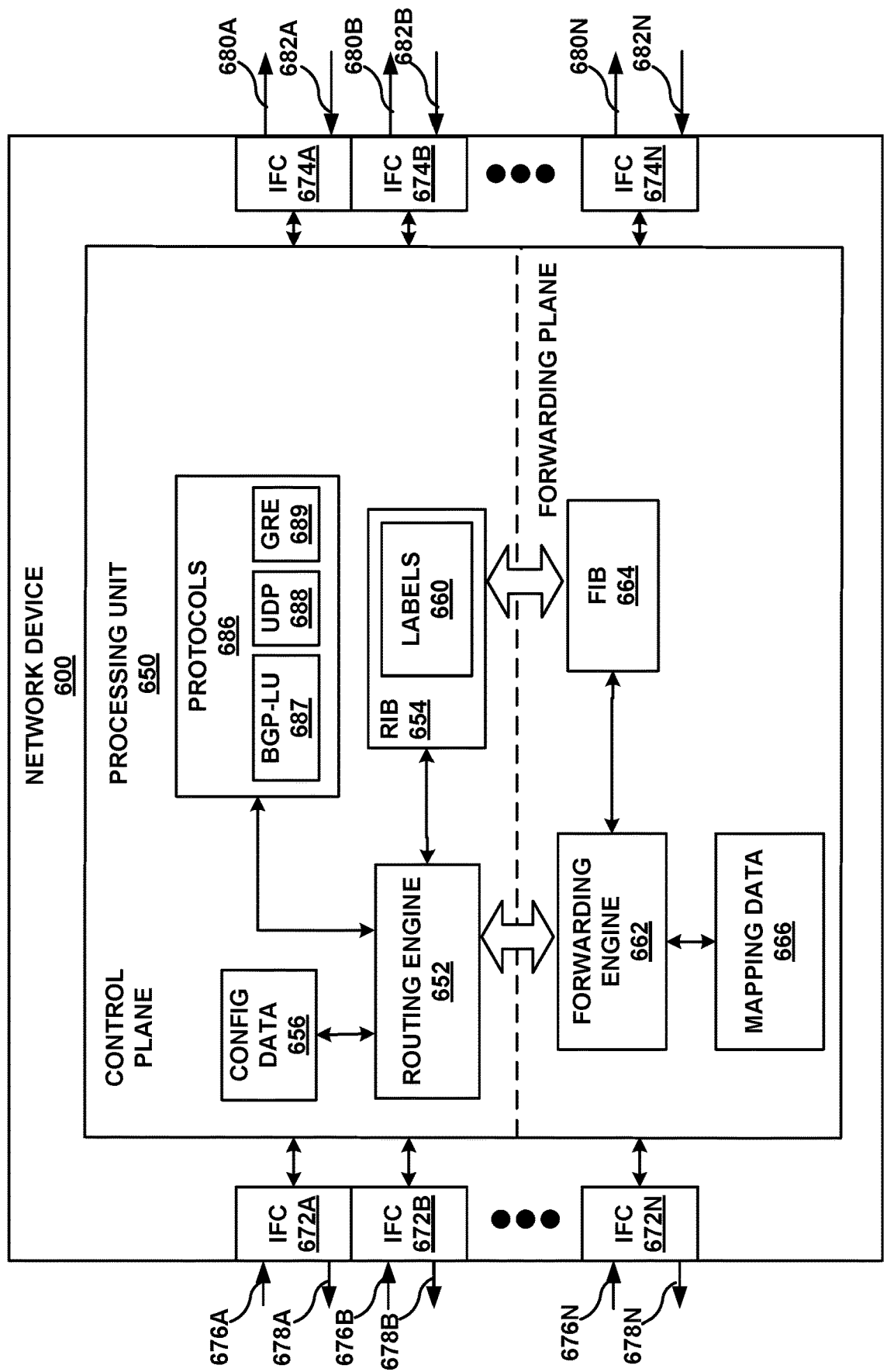
FIG. 6 is a block diagram illustrating the example network device that executes an example ASBR or gateway, in accordance with the techniques described herein.

FIG. 6 is a block diagram illustrating the example network device that executes an example ASBR or gateway, in accordance with the techniques described herein. In the example of FIG. 6, network device 600 includes access-facing interface cards 672A-672N ("access-facing IFCs 672") for communicating packets via inbound links 676A-676N ("inbound links 676") and outbound links 678A-678N ("outbound links 678") and core-facing interface cards 674A-674N ("core-facing IFCs 674") for communicating packets via outbound links 680A-680N ("outbound links

680") and inbound links 682A-682N ("inbound links 682"). Core-facing IFCs 674 are coupled to outbound links 680 and inbound links 682, and access-facing IFCs 672 are coupled to inbound links 676 and outbound links 678, via a number of interface ports (not shown). Each of access-facing IFCs 672 are coupled to a respective network device of one or more data centers, e.g., data center 10A, within an autonomous system, while each of core-facing IFCs 674 are coupled to gateway device 11 of service provider network 8 within another autonomous system. It should be understood that the letter "N" is used to represent an arbitrary number of devices, and moreover, that the number of IFCs 672 is not necessarily equal to the number of IFCs 674, although the cardinality for both IFCs 672 and IFCs 674 is designated using the variable "N."

Network device 600 also includes processing unit 650. Processing unit 650 includes routing engine 652, routing information base (RIB) 654, forwarding engine 662, and forwarding information base (FIB) 664. The routing information base 654 stores label information in labels table 660. Label information may include BGP-LU labels used to communicate between border routers of autonomous systems.

Processing unit 650 may be implemented in hardware, software, firmware, or any combination thereof. In one example, instructions for forwarding engine 662 are encoded in a computer-readable storage medium and are executed by a processor of processing unit 650. In other examples, forwarding engine 662 corresponds to a discrete hardware unit, such as a digital signal processor (DSPs), application specific integrated circuit (ASICs), field programmable gate array (FPGAs), or any other equivalent integrated or discrete logic circuitry or combination thereof. Similarly, routing engine 652 comprises any combination of hardware, software, and/or firmware that executes one or more routing protocols to determine routes through a network.

Processing unit 650 may store configuration data 656 ("config data 656"). Configuration data 656 is typically provided by SDN controller to define the configuration data for network device 600, including specifying IFCs 672, 674.

Routing engine 652 may implement one or more protocols 686 to execute routing processes. For example, routing protocols 686 may include Border Gateway Protocol Labeled Unicast 687 ("BGP-LU"), for exchanging MPLS labels mapped to routing information with other routing devices of another autonomous system, and for updating routing information base 654. For example, network device 600 may receive a routing advertisement message (i.e., BGP update message) in accordance with BGP-LU 687 from a BGP peer, and may store the MPLS label included in the routing advertisement message in labels table 660.

In accordance with the techniques described in this disclosure, routing engine 652 may implement one or more protocols 686 to communicate with an SDN controller (e.g., SDN controller 23 of FIG. 1) such that network device 600 may share labels to the SDN controller or receive labels learned from the SDN controller. In some examples in which network device 600 operates as an ASBR (e.g., ASBR 24 of FIG. 1), routing engine 652 may implement BGP-LU 687 to establish an iBGP session with the SDN controller such that the SDN controller may learn the BGP-LU labels stored in labels table 660. In some examples in which network device 600 operates as a gateway device (e.g., gateway device 11 of FIG. 1), routing engine 652 may implement BGP-LU 687 to establish an eBGP session with the SDN controller such that network device 600 may communicate with the SDN controller to learn a VPN label that the SDN controller learned from a virtual router (e.g., virtual router 13 of FIG. 1) of a different autonomous system, and store the VPN label in labels table 660.

Routing engine 652 may also implement one or more protocols 686 to execute tunneling processes. In some examples in which network device 600 is an ASBR (e.g., ASBR 24 of FIG. 1), protocol 686 may include user datagram protocol (UDP) 688 and/or generic routing encapsulation (GRE) 689 to implement MPLSoUDP or MPLSoGRE tunnel encapsulation to exchange routing information with one or more virtual routers and the ASBR. Protocols 686 may include other routing protocols to execute routing processes.

Figure 7:
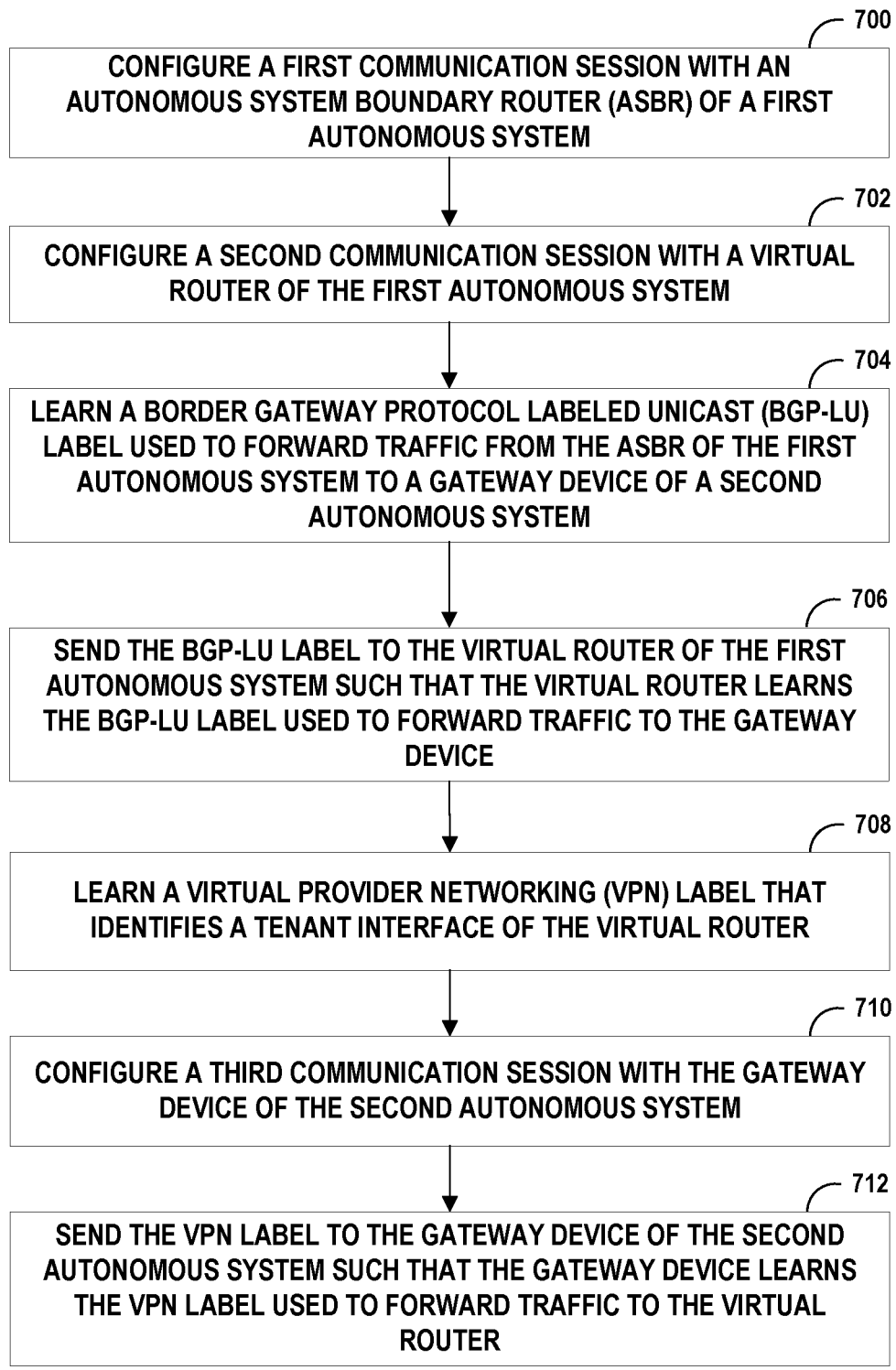
FIG. 7 is a flowchart illustrating an example operation in accordance with the techniques of the disclosure.

FIG. 7 is a flowchart illustrating an example operation in accordance with the techniques of the disclosure. For convenience, FIG. 7 is described with respect to SDN controller 23 of FIGS. 1 and 2. In the example of FIG. 7, SDN controller 23 may configuring a first communication session with an autonomous system border router (ASBR) 24 of data center 10A within a first autonomous system (700). For example, SDN controller 23 may configure an internal BGP session with ASBR 24 to learn BGP-LU labels that ASBR 24 learned from gateway device 11.

SDN controller 23 may configure a second communication session with virtual router 13A of data center 10A of the first autonomous system (702). For example, SDN controller 23 may configure an XMPP session with VR 13A to share the BGP-LU labels learned from ASBR 24. In some examples, SDN controller 23 may configure a route including the BGP-LU labels learned from ASBR 24 to install the route at VR 13A.

SDN controller 23 may learn a BGP-LU label used to forward traffic from ASBR 24 of the first autonomous system to gateway device 11 of a second autonomous system (704). For example, SDN controller 23 may use the iBGP session with ASBR 24 to retrieve the BGP-LU labels that ASBR 24 learned from gateway device 11.

SDN controller 23 may send the BGP-LU label to virtual router 13A of the first autonomous system such that virtual router 13A learns the BGP-LU label used to forward traffic to gateway device 11 of the second autonomous system (706). For example, SDN controller 23 may use the XMPP session with VR 13A to configure a route including the BGP-LU labels learned from ASBR 24 and install the route at VR 13A.

SDN controller may learn a VPN label used to identify a VPN tenant interface of virtual router 13A (710). For example, SDN controller 23 may use the XMPP session with VR 13A to learn a VPN label that identifies a VPN tenant interface of VR 13A.

SDN controller 23 may configure a third communication session with gateway device 11 of the second autonomous system (708). For example, SDN controller 23 may configure an L3VPN session with gateway device 11 to share the VPN label that SDN controller 23 learned from VR 13A.

SDN controller 23 may send the VPN label to gateway device 11 of the second autonomous system such that gateway device 11 learns the VPN label used to forward traffic to the virtual router (712). For example, SDN controller 23 may use the eBGP session with gateway device 11 to share the VPN labels learned from VR 13A. In some examples, SDN controller 23 may configure a route including the VPN label and install the route at gateway device 11.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   configuring, by a software defined networking (SDN) controller, a first communication session with an autonomous system border router (ASBR) of a data center within a first autonomous system, wherein the data center includes a compute node having configured a virtual router;
   configuring, by the SDN controller, a second communication session with the virtual router of the first autonomous system;
   learning, by the SDN controller and from the ASBR via the first communication session, a Border Gateway Protocol Labeled Unicast (BGP-LU) label used to forward traffic from the ASBR of the first autonomous system to a gateway device of a second autonomous system; and
   sending, by the SDN controller via the second communication session, the BGP-LU label to the virtual router of the first autonomous system such that the virtual router learns the BGP-LU label used to forward traffic to the gateway device of the second autonomous system.

2. The method of claim 1, further comprising:
   learning, by the SDN controller and from the virtual router via the second communication session, a virtual provider networking (VPN) label that identifies a tenant interface of the virtual router of the first autonomous system;

configuring, by the SDN controller, a third communication session with the gateway device of the second autonomous system; and sending, by the SDN controller and via the third communication session, the VPN label to the gateway device of the second autonomous system such that the gateway device learns the VPN label used to forward traffic to the virtual router of the first autonomous system.

3. The method of claim 2,
wherein configuring the third communication session with the gateway comprises configuring layer 3 virtual private networking (L3VPN) session with the gateway device.

4. The method of claim 2, further comprising:
storing, by the SDN controller and in response to learning the BGP-LU label from the ASBR, the BGP-LU label in a labels table; and
storing, by the SDN controller and in response to learning the VPN label from the virtual router, the VPN label in the labels table,
wherein the labels table comprises:
a BGP-LU address family that includes respective network addresses of the ASBR, the virtual router, and the gateway device that are connected to the SDN controller, and
tunnel encapsulation information including VPN routes for the BGP-LU address family.

5. The method of claim 1,
wherein configuring the first communication session with the ASBR comprises configuring an interior BGP session with the ASBR,
wherein configuring the second communication session with the virtual router comprises configuring an Extensible Messaging and Presence Protocol (XMPP) session.

6. A software defined networking controller comprising:
one or more processors, wherein the one or more processors are configured to:
configure a first communication session with an autonomous system border router (ASBR) of a data center within a first autonomous system, wherein the data center includes a compute node having configured a virtual router;
configure a second communication session with the virtual router of the first autonomous system;
learn, from the ASBR via the first communication session, a Border Gateway Protocol Labeled Unicast (BGP-LU) label used to forward traffic from the ASBR of the first autonomous system to a gateway device of a second autonomous system; and
send, via the second communication session, the BGP-LU label to the virtual router of the first autonomous system such that the virtual router learns the BGP-LU label used to forward traffic to the gateway device of the second autonomous system.

7. The software defined networking controller of claim 6, wherein the one or more processors are further configured to:
learn, from the virtual router via the second communication session, a virtual provider networking (VPN) label that identifies a tenant interface of the virtual router of the first autonomous system;
configure a third communication session with the gateway device of the second autonomous system;

send, via the third communication session, the VPN label to the gateway device of the second autonomous system such that the gateway device learns the VPN label used to forward traffic to the virtual router of the first autonomous system.

8. The software defined networking controller of claim 7, wherein to configure the third communication session with the gateway device, the one or more processors are further configured to configure a layer 3 virtual private networking (L3VPN) session with the gateway device.

9. The software defined networking controller of claim 7, wherein the one or more processors are further configured to:
store, in response to learning the BGP-LU label from the ASBR, the BGP-LU label in a labels table; and
store, in response to learning the VPN label from the virtual router, the VPN label in the labels table,
wherein the labels table comprises:
a BGP-LU address family that includes respective network addresses of the ASBR, the virtual router, and the gateway that are connected to the SDN controller, and
tunnel encapsulation information including VPN routes for the BGP-LU address family.

10. The software defined networking controller of claim 6,
wherein, to configure the first communication session with the ASBR, the one or more processors are further configured to configure an interior BGP session with the ASBR, and
wherein, to configure the second communication session with the virtual router, the one or more processors are further configured to configure an Extensible Messaging and Presence Protocol (XMPP) session.

11. A data center within a first autonomous system comprising:
a virtual router of the data center configured to:
learn, from a software defined networking (SDN) controller via a first communication session between the SDN controller and the virtual router, a border gateway protocol labeled unicast (BGP-LU) label used to forward traffic from an autonomous system border router (ASBR) of the first autonomous system to a gateway device of a second autonomous system,
configure an encapsulated packet destined for the gateway device of the second autonomous system, wherein the encapsulated packet comprises an outer label including the BGP-LU label and an inner label including a VPN label that identifies a tenant interface of the virtual router of the data center, and
send, to the ASBR, the encapsulated packet over a tunnel between the virtual router and the ASBR.

12. The data center of claim 11, further comprising:
the ASBR, wherein the ASBR is configured to:
learn, from the gateway device of the second autonomous system, the BGP-LU label from a route advertisement message,
receive the encapsulated packet from the virtual routers over the tunnel, and
send, in response to receiving the encapsulated packet from the virtual router and based on the outer label including the BGP-LU label, the encapsulated packet to the gateway device of the second autonomous system.

13. The data center of claim 11, wherein the ASBR is further configured to:

receive, from the gateway of the second autonomous system, traffic destined for the virtual router, wherein the traffic includes a virtual private networking (VPN) label that identifies a tenant interface of the virtual router of the first autonomous system, remove, in response to receiving the traffic from the gateway of the second autonomous system, the BGP-LU label from the traffic, and send, in response to removing the BGP-LU label from the traffic, the traffic with only the VPN label.

14. The data center of claim 11, wherein the first communication session comprises an interior Border Gateway Protocol (iBGP) session, and wherein the second communication session comprises an Extensible Messaging and Presence Platform (XMPP) session.

15. The data center of claim 11, wherein the tunnel comprises at least one of a Multiprotocol Label Switching over Generic Routing Encapsulation (MPLSoGRE) tunnel and a Multiprotocol Label Switching over User Datagram Protocol (MPLSoUDP).

* * * * *